US006807378B1

United States Patent
Pincemin

(10) Patent No.: US 6,807,378 B1
(45) Date of Patent: Oct. 19, 2004

(54) RZ SIGNAL OPTICAL REGENERATOR LIMITING NOISE IN "ZEROS"

(75) Inventor: Erwan Pincemin, Gommenec'h (FR)

(73) Assignee: Alcatel, Paris (FR)

( * ) Notice: Subject to any disclaimer, the term of this patent is extended or adjusted under 35 U.S.C. 154(b) by 540 days.

(21) Appl. No.: 09/667,631

(22) Filed: Sep. 22, 2000

(30) Foreign Application Priority Data

Sep. 24, 1999 (FR) .............................. 99 11980

(51) Int. Cl.[7] .................... H04B 10/02; H04B 10/04
(52) U.S. Cl. ...................... 398/175; 398/176; 398/186; 398/188
(58) Field of Search ................. 398/175, 176, 398/180, 186, 188; 375/346, 284, 278

(56) References Cited

U.S. PATENT DOCUMENTS

| | | | | |
|---|---|---|---|---|
| 5,325,225 A | * | 6/1994 | Suzaki et al. ............... | 398/195 |
| 5,401,957 A | * | 3/1995 | Suzuki et al. .......... | 250/227.21 |
| 5,502,588 A | * | 3/1996 | Abram ....................... | 398/146 |
| 6,097,525 A | * | 8/2000 | Ono et al. .................. | 398/185 |
| 6,108,125 A | * | 8/2000 | Yano .......................... | 359/344 |
| 6,342,962 B2 | * | 1/2002 | Marcerou et al. ........... | 398/146 |
| 6,373,608 B1 | * | 4/2002 | Desurvire et al. .......... | 398/154 |

FOREIGN PATENT DOCUMENTS

GB  2 299 232 A  9/1996

OTHER PUBLICATIONS

Gido, S. et al.: "Dual–Control Nonlinear–Optical Loop Mirrors for All–Optical Soliton Synchronous Modulation" Optics Letters, US, Optical Society of America, Washington, vol. 21, No. 18, Sep. 15, 1996, pp. 1463–1465, XP000630829.

Leclerc, O. et al.: "2 + 20 BIT/S, 3500 KM Regenerated WDM Soliton Transmission with all–Optical Kerr Fibre Modulation" Electronic Letters, GB, IEE Stevenage, vol. 34, No. 2, Jan. 22, 1998, pp. 199–201, XP000773678, ISSN: 0013–5194.

* cited by examiner

Primary Examiner—M. R. Sedighian
Assistant Examiner—Dzung Tran
(74) Attorney, Agent, or Firm—Sughrue Mion, PLLC

(57) ABSTRACT

A regenerator for an RZ optical signal transmission system applies a relative time shift to the signals as a function of their intensity and includes an intensity modulator for modulating the shifted signals. The shift between signals corresponding to a "zero" value and signals corresponding to a "one" value is such that the modulation intensity for signals corresponding to a "zero" value is less than the modulation intensity for signals corresponding to a "one" value. A shift equal to half the bit time between signals corresponding to a "one" value and signals corresponding to a "zero" value can therefore be chosen. The modulation intensity is then maximum for signals corresponding to a "one" value and minimum for signals corresponding to a "zero" value. The regenerator limits noise in the "zeros" of an RZ signal and regenerates the "ones".

18 Claims, 2 Drawing Sheets

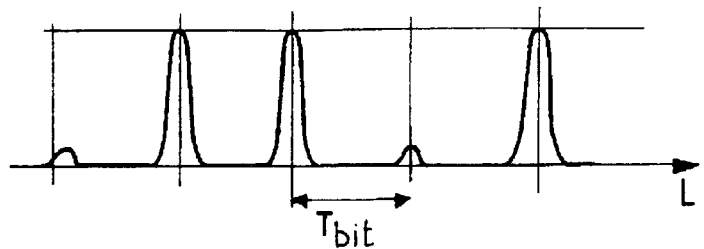
FIG_1
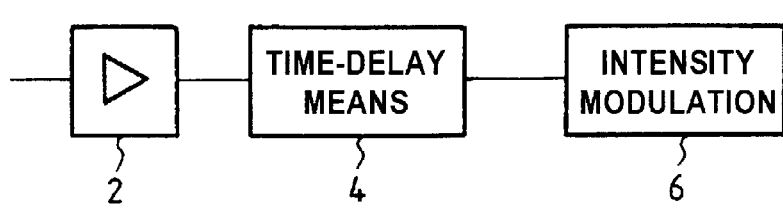
FIG_2
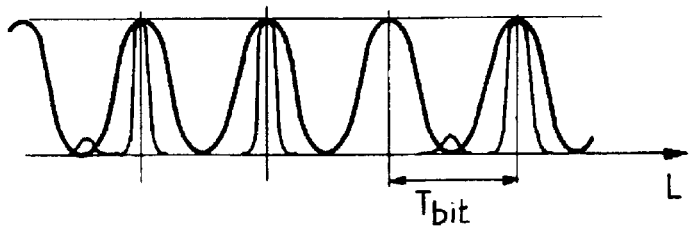
FIG_3
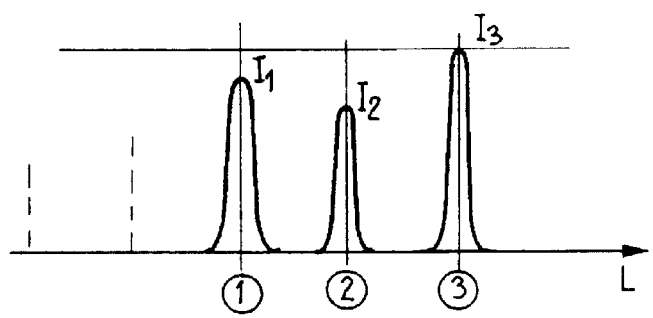
FIG_4
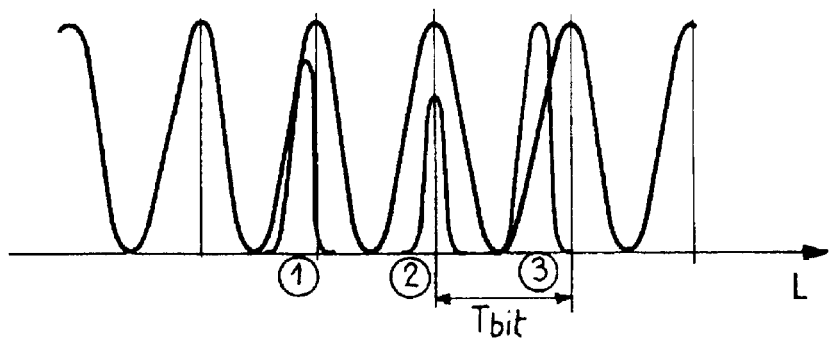
FIG_5

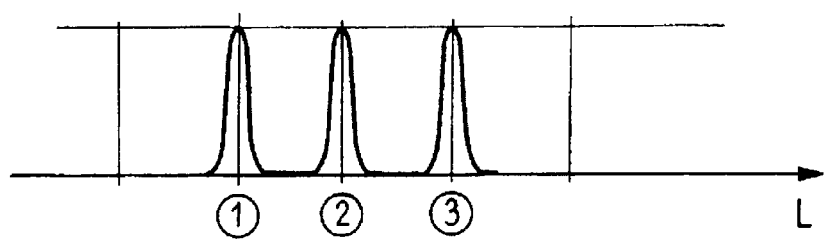
FIG_6

RZ SIGNAL OPTICAL REGENERATOR LIMITING NOISE IN "ZEROS"

BACKGROUND OF THE INVENTION

1. Field of the Invention

The present invention relates to the field of fiber optic transmission and more particularly to optical regeneration in fiber optic transmission systems. It applies in particular to RZ (return to zero) signal transmission systems, for example soliton signal transmission systems. The RZ signal corresponding to the transmission of a high logic value is referred to as a pulse or a "one". The absence of signal, which corresponds to the transmission of a low logic value, is referred to as a "zero".

2. Description of the Prior Art

The transmission of soliton pulses (solitons) in the part of an optical fiber with abnormal dispersion is a phenomenon known in the art. Solitons are pulse signals with a $sech^2$ shape. With this pulse shape, non-linearity in the corresponding part of the fiber compensates the dispersion of the optical signal. Modeling the transmission of solitons using the Schrödinger non-linear equation is known in the art. Dispersion-managed soliton transmission systems have also been proposed. Such systems use a dispersion pattern which repeats periodically over thousands of kilometers; an abnormal dispersion (positive dispersion) fiber follows on from a normal dispersion (negative dispersion) fiber which compensates almost all the cumulative abnormal dispersion in the first type of fiber. The signals therefore propagate in fibers with high local dispersion but the overall average dispersion is very low. A transmission scheme of this kind significantly reduces the effects of jitter (because of the low average dispersion), significantly reduces the effects of collisions between channels (because of the high local dispersion), improves the signal-to-noise ratio and increases the spectral efficiency of the system. A system of the above kind is described in an article by N. J. Smith and N. J. Doran, Journal of Lightwave Technology, vol. 15, No. 10 (1997), p. 1808 et seq., for example.

Synchronous modulation of soliton signals by a clock signal (clock) to correct jitter has already been proposed; intensity modulation is described in an article by H. Kubota and M. Nakasawa, IEEE Journal of Quantum Electronics, vol. 29, No. 7 (1993), p. 2189 et seq., for example; an article by N. J. Smith and N. J. Doran, Optical Fiber Technology, 1, p. 218 (1995) proposes phase modulation.

A problem encountered in fiber optic transmission systems is the distortion to which optical signals are subjected when they are generated, transmitted or switched, more generally at the time of any optical processing in the transmission system. Optical regeneration by intensity modulation aims to solve this distortion problem by applying to each bit a signal of maximum intensity at the center of the time window of the bit and of low intensity at the edges of the time window.

However, intensity modulation does not provide an entirely satisfactory solution, in particular in respect of the "zeros" of RZ signals. The noise in the "zeros", i.e. the noise in the time windows corresponding to a zero bit, or to a bit with no signal, is not completely eliminated, in particular in transoceanic transmission systems. There remain signals which are sometimes referred to as "phantom" peaks.

Furthermore, in standard optical regenerators, intensity modulation increases amplitude fluctuations and amplitude noise is stabilized by a narrow filter following regeneration. The quality of stabilization of the amplitude noise is good for a soliton signal transmission system using the standard Schrddinger equation propagation. However, it is a problem in dispersion-managed soliton signal transmission systems because this type of transmission is locally much less non-linear than Schrödinger soliton transmission, the consequence of which is to reduce the efficiency of the filter.

The invention proposes a solution to this problem of noise in transmission "zeros". It eliminates noise by eliminating the "phantom" peaks.

The invention also reduces amplitude fluctuations in the "ones" of RZ signals and in particular effectively stabilizes the amplitude of the "ones" in dispersion-managed soliton signal transmission systems. This virtual suppression of amplitude noise in the "ones" of RZ signals is accompanied by the possibility of dispensing with a narrow filter behind the regenerator of the invention. This opportunity not to associate any filter with the regenerator is one of the strengths of the invention, especially as a scheme of this kind is valid not only in standard Schrödinger soliton signal transmission but also in dispersion-managed soliton signal propagation.

Thus the invention proposes a solution which eliminates "phantom" peaks in the "zeros"—localized noise in the "zeros"—and stabilizes the amplitude in the "ones" of RZ signals, and in particular in Schrödinger solitons or dispersion-managed solitons, without necessarily using a filter.

SUMMARY OF THE INVENTION

To be more precise, the invention proposes a regenerator for an RZ optical signal transmission system, including means for applying a relative time shift to the signals as a function of their intensity and an intensity modulator for modulating the shifted signals, wherein the shift between signals corresponding to a "zero" value and signals corresponding to a "one" value is such that the modulation intensity for signals corresponding to a "zero" value is less than the modulation intensity for signals corresponding to a "one" value.

In one embodiment the shift between signals corresponding to a "zero" value and signals corresponding to a "one" value is such that the modulation intensity for signals corresponding to a "zero" value is minimum and the modulation intensity for signals corresponding to a "one" value is maximum.

In another embodiment the shift between signals corresponding to a "zero" value and signals corresponding to a "one" value is such that the modulation intensity for signals corresponding to a "zero" value is at least 6 dB less than the modulation intensity for signals corresponding to a "one" value.

The modulation signal of the modulator is preferably a sinusoidal signal which has a period equal to the bit time and the shift between signals corresponding to a "zero" value and signals corresponding to a "one" value is equal to half the bit time.

In another embodiment the regenerator further includes an amplifier whose output is connected to the shifting means.

The shifting means advantageously include a non-linear medium, for example a chalcogenide fiber.

In one embodiment the non-linear medium has an index of non-linearity $n_2$ equal to $n_2=(T_{bit}/2)\times(c/L_{NL})\times(S_{eff}/I_1)$ where $T_{bit}$ is the bit time, c is the velocity of light, $L_{NL}$ is the length of the non-linear medium, $S_{eff}$ is the effective cross section and $I_1$ is the set point intensity of a signal corresponding to a "one" value.

The non-linear medium can also be an optical cell.

The invention also proposes a regeneration method for an RZ optical signal transmission system, including the steps of time shifting the signals relative to each other as a function of their intensity and intensity modulating the shifted signals, wherein the relative time shift of signals corresponding to a "zero" value and signals corresponding to a "one" value is such that the modulation intensity for signals corresponding to a "zero" value is less than the modulation intensity for signals corresponding to a "one" value.

The shifting step advantageously includes shifting signals corresponding to a "zero" value relative to signals corresponding to a "one" value so that the modulation intensity for signals corresponding to a "zero" value is minimum and the modulation intensity for signals corresponding to a "one" value is maximum.

The shifting step can also include shifting signals corresponding to a "zero" value relative to signals corresponding to a "one" value so that the modulation intensity for signals corresponding to a "zero" value is at least 6 dB less than the modulation intensity for signals corresponding to a "one" value.

In one embodiment the modulation step includes modulation by a sinusoidal signal whose period is equal to the bit time and the shifting step includes application of a shift equal to half the bit time between signals corresponding to a "zero" value and signals corresponding to a "one" value.

The regenerator preferably further includes an amplification step before the shifting step.

In one embodiment the shifting step includes passing the signals through a non-linear medium, such as a non-linear medium in the form of an optical fiber, for example a chalcogenide fiber.

The non-linear medium advantageously has an index of non-linearity $n_2$ equal to $n_2=(T_{bit}/2)\times(c/L_{NL})\times(S_{eff}/I_1)$ where $T_{bit}$ is the bit time, c is the velocity of light, $L_{NL}$ is the length of the non-linear medium, $S_{eff}$ is the effective cross section and $I_1$ is the set point intensity of a signal corresponding to a "one" value.

The shifting step can also include passing the signals through a non-linear medium in the form of an optical cell.

Other features and advantages of the invention will become apparent on reading the following description of embodiments of the invention, which is given by way of example and with reference to the accompanying drawings.

BRIEF DESCRIPTION OF THE DRAWINGS

FIG. 1 is a diagrammatic representation of an RZ signal.

FIG. 2 is a diagrammatic representation of a regenerator according to the invention.

FIG. 3 is a diagrammatic representation of intensity modulation in the FIG. 2 regenerator applied to the FIG. 1 signal.

FIG. 4 is a diagrammatic representation of three bits at "one" subject to amplitude variations.

FIG. 5 is a diagrammatic representation of intensity modulation in accordance with the invention applied to the FIG. 4 signal.

FIG. 6 is a diagrammatic representation of the results of the modulation.

DETAILED DESCRIPTION OF THE PREFERRED EMBODIMENT

To reduce the noise in the zeros of RZ signals, the invention proposes to generate a time-delay between the RZ signals, as a function of their intensity, before intensity modulating them. The time-delay is applied so that the maximum intensity of the intensity modulation is applied to pulses corresponding to "ones" of an average amplitude and the minimum intensity is applied to "zeros". The invention therefore significantly reduces noise in the "zeros". Furthermore, because the time-delay is dependent on the intensity of the pulses, the invention also corrects intensity variations of bits at "one". The invention proposes the use of a highly non-linear medium to apply to the pulses a time-delay which is a function of their intensity.

FIG. 1 is a diagrammatic representation of an RZ signal in which time or the distance along a transmission system is plotted on the abscissa axis and intensity is plotted on the ordinate axis. The figure shows five bits with successively transmitted values of 1, 0, 1, 1 and 0, from right to left in the figure. As is standard practice for an RZ signal, the "ones" are coded by a pulse with a high intensity peak and the "zeros" are coded by an absence of any pulse; nevertheless, and as shown in the figure, pulses with a lower intensity peak do occur in the "zeros". As stated above, one objective of the invention is to reduce further the intensity of such peaks.

FIG. 2 is a diagrammatic representation of a regenerator according to the invention; it includes means 4 for shifting the RZ signals relative to each other as a function of their intensity; the signals supplied at the output of the means 4 are passed to an intensity modulator 6. The FIG. 1 embodiment further includes an amplifier 2 upstream of the means 4. The amplifier is of a type known in the art; any type of modulator known in the art can be used to apply the intensity modulation, for example those described in the articles cited above.

The means 4 advantageously include a highly non-linear medium in which, because of the Kerr effect, the refractive index varies as a function of the intensity of the transmitted signals, in accordance with the following law:

$$n(I)=n_o+n_2\times I$$

In the above equation, $n_o$ is the linear refractive index of the medium, $n_2$ is the non-linear refractive index of the medium and I is the intensity of the signal. A variation law of the above kind produces a higher refractive index for relatively higher intensity pulses than for relatively lower intensity pulses. Because the propagation velocity in the non-linear medium is inversely proportional to the index, relatively lower intensity pulses corresponding to "zeros" propagate faster than relatively higher intensity pulses corresponding to "ones". The relative shift between the signals corresponding to "zeros" and the signals corresponding to "ones" at the output of the means 4 is defined by an appropriate choice of the medium, and by pre-amplification of the signals by the amplifier 2, if necessary. The shift is advantageously equal to half the bit time ($T_{bit}/2$).

FIG. 3 is a diagrammatic representation of intensity modulation applied to the FIG. 1 signal in the FIG. 2 regenerator; the coordinate axes are the same as in FIG. 1. FIG. 3 shows a shift between the "zeros" and the "ones" equal to half the bit time. The intensity modulation is shown in bold line in FIG. 3, and in this example is a standard sinusoid. The figure shows that the relatively higher intensity pulses corresponding to "ones" are centered on the bit time and on the intensity maxima of the modulation signal. On the other hand, the relatively higher intensity pulses corresponding to "zeros" are centered on the intensity minima of the modulation signal. This is achieved by recovering the modulator clock, which is locked to the relatively higher intensity pulses, and not to the relatively lower intensity pulses. The invention therefore modulates the intensity of the pulses corresponding to 'ones", as in prior art regenerators; it also reduces noise in the "zeros" of the signal.

An RZ signal which is identical in terms of its content to the input signal, but in which the "ones" have been regenerated and noise in the "zeros" has been eliminated or greatly reduced, is obtained at the output of the intensity modulator, or at the output of the regenerator according to the invention.

The invention also reduces amplitude fluctuations of the relatively higher intensity pulses corresponding to "ones", as will now be explained with reference to FIGS. 4 to 6. FIG. 4 is a diagrammatic representation of three bits at "one"subject to amplitude variations; the three pulses shown by way of example have different intensities $I_1, I_2$ and $I_3$, with $I_2 < I_1 < I_3$. The intensity value $I_2$ corresponds to the normal average value of the pulses, and the intensity of the other two pulses is too high. On entering the highly non-linear means 4, the first and third pulses, which have a higher intensity, propagate more slowly, and arrive with a time-delay relative to the center of the bit time defined at the start of propagation. In other words, the time-delay of the third pulse relative to the center of the initial bit time—i.e. defined just before entering the time-delay means 4—is greater than the time-delay of the second pulse relative to the center of the initial bit time, and the intensity $I_3$ of the third pulse is greater than the intensity $I_2$ of the second pulse. The first pulse is not shifted relative to the center of the initial bit time. This is because the signal should be seen as a logical sequence of "ones" and "zeros". The intensity of the "ones" is random, because it is polluted by the amplitude fluctuations. Those amplitude fluctuations can be modeled by a Gaussian distribution characterized by a variance and an average value.

Clock recovery is applied to the pulses whose intensity is close to the average value. Clock recovery will lock onto pulses whose intensity is close to the average value, rather than pulses whose intensity is far from the average value. As shown in FIG. 5, using the some conventions as FIG. 3, the second pulse is centered on a maximum of the intensity modulation signal but the first and third pulses, which are delayed relative to the second pulse, are shifted relative to the maximum of the modulation signal and therefore clipped.

FIG. 6 is a diagrammatic representation of the results of the modulation shown in FIG. 5; the first and third pulses have been clipped and recentered in the bit time, and the three pulses have the same intensity. Thus the invention not only reduces noise in the "zeros" but also reduces intensity fluctuations between the "ones".

It is clear from the explanations given with reference to FIGS. 4 to 6 that the regenerator of the invention reduces intensity fluctuations between the pulses by clipping the pulses of greater intensity. The presence of the amplifier 2 in the regenerator enables adequate amplification of the signals so that "ones" whose intensity is close to the average value of the Gaussian distribution of the intensities of all the "ones" arrive centered on the modulation maxima of the intensity modulator. The invention therefore reduces the amplitude noise of the signals without requiring a narrow filter; it is independent of the dispersion in the system, and therefore applies to any type of RZ signal optical transmission system, and in particular to dispersion-managed soliton signal transmission systems.

The various components of the modulator according to the invention are described in more detail below. As explained with reference to the previous figures, in the optimum configuration of the regenerator, the shift between the "zeros" and the "ones" at the exit from the highly non-linear medium is equal to half the bit time; this condition depends, of course, on the shape of the modulation signal, and corresponds to a sinusoidal signal or to a signal which is symmetrical about one of its maxima. It is clear that the invention is still operative if this condition is not met exactly. Satisfactory results can be obtained if the "zeros" of the signal arrive in the parts of the time profile of the intensity modulation in which the modulation intensity is at a minimum, for example at least 6 dB down relative to the maximum modulation intensity.

The characteristics of the highly non-linear medium used to apply the shift between the "zeros" and the "ones" can be determined in the following manner: the difference between the propagation times of a "zero" and a "one" in a medium of length $L_{NL}$ is written $$\Delta\tau = L_{NL}/v(I_1) - L_{NL}/v(I_0) \quad (1)$$

In the above equation, $v(I_1)$ and $v(I_0)$ are the respective velocities of the "ones"and the "zeros" in the non-linear medium.

Those velocities are inversely proportional to the index of the medium, which can be written as follows:

$$n(I) = n_o + (n_2/S_{eff}) \times I \quad (2)$$

The above equation uses the same notation as before, but relates to propagation in an optical fiber, $S_{eff}$ being the effective cross section of the fiber. The following equations, in which c is the velocity of light, are obtained by combining equations (1) and (2):

$$\Delta\tau = L_{NL} \times (n_o + (n_2/S_{eff}) \times I_1)/c - L_{NL} \times (n_o + (n_2/S_{eff}) \times I_0)/c \quad (5)$$

$$\Delta\tau = (L_{NL}/c) \times (n_2/S_{eff}) \times (I_1 - I_0)$$

With $I_0 \approx 0$, the intensity of the pulses corresponding to "zeros" remaining low:

$$\Delta\tau = (L_{NL}/c) \times (n_2/S_{eff}) \times I_1 \quad (3)$$

By choosing a shift $\Delta\tau$ equal to half the bit time ($T_{bit}/2$), the following equation is obtained for $n_2$:

$$n_2 = (T_{bit}/2) \times (c/L_{NL}) \times (S_{eff}/I_1) \quad (4)$$

The above equation is used to determine the characteristics of the non-linear medium, and in particular its non-linear refractive index, its length and its effective cross section.

For example, taking a bit time $T_{bit}$ of 25 ps, a non-linear medium length $L_{NL}$ of 10 km, an effective cross section $S_{eff}$ of 50 $\mu m^2$, and an intensity $I_1$ of 100 mW (20 dBm), and with $c = 3 \times 10^8$ m/s, from equation (4):

$$n_2 = 1.875 \times 10^{-16} \text{ m}^2/W$$

Or, taking a bit time $T_{bit}$ of 25 ps, a non-linear medium length $L_{NL}$ of 20 km, an effective cross section $S_{eff}$ of 20 $\mu m^2$, and an intensity $I_1$ of 1000 mW, from equation (4):

$$n_2 = 3.75 \times 10^{-18} \text{ m}^2/W$$

A power of 1 000 mW (30 dBm) can be obtained at the output of a standard optical amplifier, for example at the output of an erbium-doped fiber amplifier (EDFA).

The above values should be compared with the standard values of the index of non-linearity for standard fibers, which are of the order of $2.5 \times 10^{-20}$ m$^2$/W. They can be achieved using new non-linear materials, for example chalcogenides ($As_2S_3$). These materials provide index of non-linearity values of the order of $5 \times 10^{-18}$ m$^2$/W, which may be suitable, as shown by the above calculation example.

It is also possible to use a non-linear medium which is not in the form of optical fibers, for example an optical cell containing a highly non-linear medium. This allows the use of a material having a high index of non-linearity and reduces the propagation length. $CS_2$ could be used as the non-linear material, for example.

Of course, the present invention is not limited to the examples and embodiments described and shown, but is open to many variants that will be evident to the skilled person. In particular, the value of the time shift can be varied relative to the values given here by way of example. The choice of a time shift value depends on the form of modulation and the required attenuation of the "zeros" relative to the "ones".

What is claimed is:

1. A regenerator for a return to zero (RZ) optical signal transmission system, said regenerator comprising:

time shifting means for applying a relative time shift to RZ optical signals as a function of their intensity; and
   an intensity modulator for modulating the time shifted signals, wherein said shift between said RZ optical signals corresponding to a value of zero and said RZ optical signals corresponding to a value of one is such that the modulation intensity for said RZ optical signals corresponding to the value of zero is less than the modulation intensity for said RZ optical signals corresponding to the value of one.

2. The regenerator claimed in claim 1 wherein said offset between said RZ optical signals corresponding to the value of zero and said RZ optical signals corresponding to the value of one is such that the modulation intensity for said RZ optical signals corresponding to the value of zero is minimum and the modulation intensity for said RZ optical signals corresponding to the value of one is maximum.

3. The regenerator claimed in claim 1 wherein said shift between said RZ optical signals corresponding to the value of zero and said RZ optical signals corresponding to the value of one is such that the modulation intensity for said RZ optical signals corresponding to the value of zero is at least 6 dB less than the modulation intensity for said RZ optical signals corresponding to the value of one.

4. The regenerator claimed in claim 1 wherein a modulation signal of said intensity modulator is a sinusoidal signal which has a period equal to the bit time and said shift between said RZ optical signals corresponding to the value of zero and said RZ optical signals corresponding to the value of one value is equal to half the bit time.

5. The regenerator claimed in claim 1 further comprising an amplifier whose output is connected to said time shifting means.

6. The regenerator claimed in claim 1 wherein said time shifting means include a non-linear medium.

7. The regenerator claimed in claim 6 wherein said non-linear medium is an optical fiber.

8. The regenerator claimed in claim 7 wherein said non-linear medium has an index of non-linearity $n_2$ equal to $n_2 = (T_{bit}/2) \times (c/L_{NL}) \times (S_{eff}/I_1)$ where $T_{bit}$ is the bit time, c is the velocity of light, $L_{NL}$ is the length of the non-linear medium, $S_{eff}$ is the effective cross section and $I_1$ is the set point intensity of a signal corresponding to the value of one.

9. The regenerator claimed in claim 6 wherein said non-linear medium is an optical cell.

10. A method for regenerating return to zero (RZ) optical signals, the method comprising:

time shifting RZ optical signals relative to each other as a function of their intensity; and
    intensity modulating the time shifted RZ optical signals, wherein the relative time shift of said RZ optical signals corresponding to a value of zero and said RZ optical signals corresponding to a value of one is such that the modulation intensity for said RZ optical signals corresponding to the value of zero is less than the modulation intensity for said RZ optical signals corresponding to the value of one.

11. The method claimed in claim 10 wherein said shifting step includes shifting signals corresponding to the value of zero relative to said RZ optical signals corresponding to the value of one so that said modulation intensity for said RZ optical signals corresponding to the value of zero is minimum and said modulation intensity for said RZ optical signals corresponding to the value of one is maximum.

12. The method claimed in claim 10 wherein said shifting step includes shifting said RZ optical signals corresponding to the value of zero relative to said RZ optical signals corresponding to a "one" value so that said modulation intensity for said RZ optical signals corresponding to the value of zero is at least 6 dB less than said modulation intensity for said RZ optical signals corresponding to the value of one.

13. The method claimed in claim 10 wherein said modulation step includes modulation by a sinusoidal signal whose period is equal to the bit time and said shifting step includes application of a shift equal to half said bit time between said RZ optical signals corresponding to the value of zero and said RZ optical signals corresponding to the value of one.

14. The method claimed in claim 10 further including an amplification step before the shifting step.

15. The method claimed in claim 10 wherein said shifting step includes passing said RZ optical signals through a non-linear medium.

16. The method claimed in claim 15 wherein said shifting step includes passing said RZ optical signals through a non-linear medium in the form of an optical fiber.

17. The method claimed in claim 16 wherein said non-linear medium has an index of non-linearity n2 equal to $n2=(T_{bit}/2)\times(c/L_{NL})\times(S_{eff}/I_1)$ where $T_{bit}$ is the bit time, c is the velocity of light, $L_{NL}$ is the length of the non-linear medium, $S_{eff}$ is the effective cross section and $I_1$ is the set point intensity of a signal corresponding to the value of one.

18. The method claimed in claim 15 wherein said shifting step includes passing said RZ optical signals through a non-linear medium in the form of an optical cell.

* * * * *